Feb. 20, 1934.  K. W. THALHAMMER  1,948,055
CAMERA HEAD
Filed June 8, 1927  2 Sheets-Sheet 1
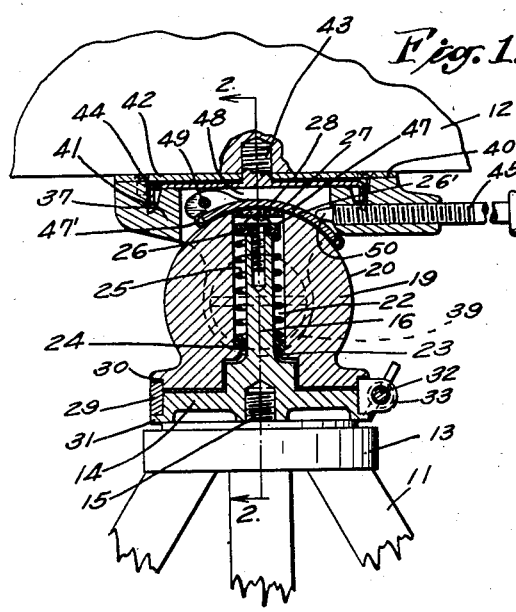
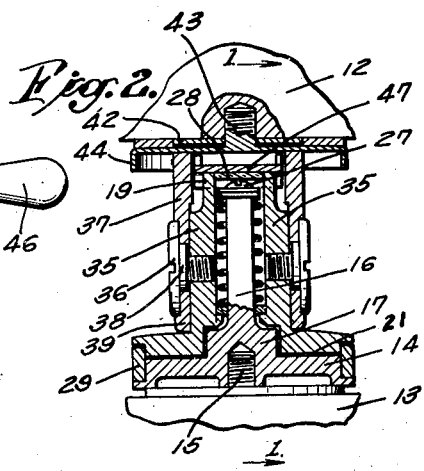
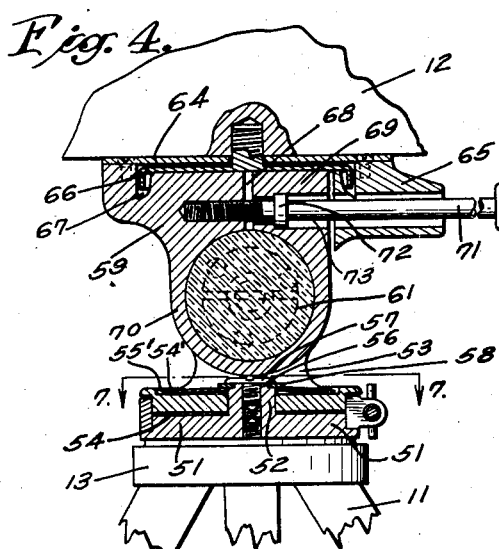
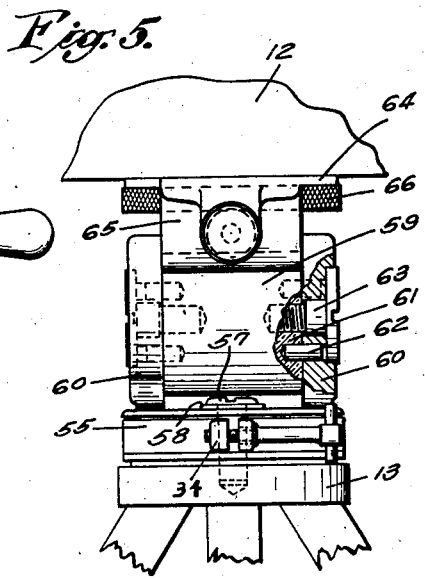
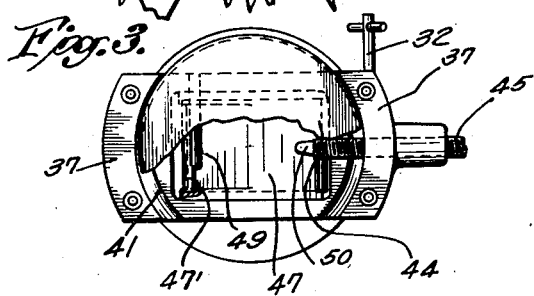
INVENTOR
Karl W. Thalhammer
By John Flam
ATTORNEY Feb. 20, 1934. K. W. THALHAMMER 1,948,055
CAMERA HEAD
Filed June 8, 1927 2 Sheets-Sheet 2

INVENTOR
Karl W. Thalhammer
By John Flam
ATTORNEY

Patented Feb. 20, 1934

1,948,055

UNITED STATES PATENT OFFICE 1,948,055

CAMERA HEAD

Karl W. Thalhammer, Los Angeles, Calif.

Application June 8, 1927. Serial No. 197,381

6 Claims. (Cl. 248—47)

This invention relates to a device for supporting a camera upon a tripod or its equivalent, and especially to one that is adjustable for the purpose of tilting or turning the camera independently of the tripod, whether said camera be a motion picture or a still camera. The head however can as well be utilized to support other forms of mechanisms, such as surveying instruments.

In the case of a motion picture camera especially, it is desirable to provide a smooth operating tilting or "panorama" for taking shots at varying angles of the camera without moving the tripod; and to accomplish this so that no jerkiness is perceptible in the finished picture. It is one of the objects of my invention to provide a simple device that fulfills these requirements.

It is another object of my invention to provide an adjustable camera or instrument head that can be readily and quickly operated to hold the camera in a clamped, rigid position; and especially arranged so that the hand used for this manual adjustment can also be used for the clamping effect without changing the position of the hand.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is a longitudinal sectional view, taken along plane 1—1 of Fig. 2, of a camera head embodying my invention, and also a fragmentary view of the tripod camera used in conjunction therewith;

Fig. 2 is a sectional view of the same head, the plane of the section being taken at right angles to that of Fig. 1, and as indicated by lines 2—2 of Fig. 1;

Fig. 3 is a top plan view of the head shown in Figs. 1 and 2, but with the top plate removed, and some of the parts being shown partly in section;

Fig. 4 is a sectional view, similar to Fig. 1, of a modified form of head;

Fig. 5 is a side view thereof, with a few of the parts in section;

Figure 6:
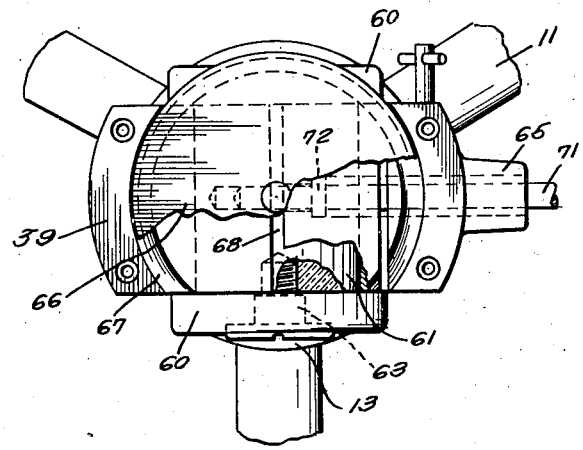
Fig. 6 is a top plan view of the head shown in Figs. 4 and 5, but with the top plate removed.
Figure 7:
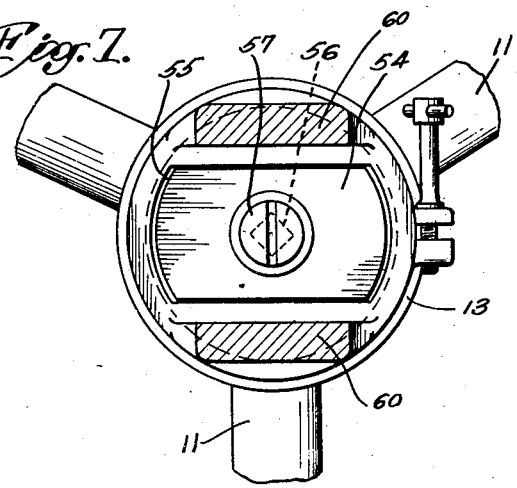
Fig. 7 is a sectional view along plane 7—7 of Fig. 4.

In order to explain the mode of operation of my invention, I show in a diagrammatic manner, a tripod 11 and the bottom of a camera 12 which is arranged to be supported on the tripod. The tripod is shown as provided with its own head 13. The adjustable head is interposed between the member 13 and camera 12, and is arranged in this instance to tilt the camera about a horizontal axis and also to rotate it about a vertical axis.

For providing the vertical axis of movement, there is rigidly fastened to the tripod head 13, a base member 14, as by the aid of the usual tripod screw 15 that engages in an appropriate aperture in the bottom of member 14. This member can serve as an integral support for the upright stud 16. This stud has an enlarged portion 17 that serves as a stationary vertical pivot for other parts of the mechanism to be now described.

Pivotally mounted on the base for turning on the vertical stationary shaft member 17, there is a joint supporting member 19. This member has a cylindrical surface 20 extending almost entirely around it. It also has a bottom surface resting adjacent the top of base 14. However, I preferably provide some friction producing material between these two surfaces, such as a thin fibre washer 21, fastened to one or the other of the opposed surfaces. Furthermore, I provide a yielding force for urging these opposed surfaces together, whereby, although member 19 can be rotated upon the exercise of a small horizontal torque, yet friction serves to maintain the relative positions upon the members being left in any adjusted position.

The arrangement for providing this resilient or yielding force will now be described. The joint member 19 has a vertical through aperture 22. This aperture accommodates stud 16 with considerable clearance. It is furthermore provided with an internal shoulder 23 serving as a seat for a washer 24. This washer in turn serves as a bearing seat for a compression spring 25, the upper end of which serves resiliently to urge a similar bearing washer 26 upwardly. This washer is confined against such movement by screw 27 tapping into the top of post or stud 16. A washer 26' overlies the bearing washer 26 and is accommodated below the screw head. It is evident that spring 25 pushes member 19 resiliently down against base 14. A plug 28 of fibre or the like can be placed into aperture 22 to cover this screw.

As thus far explained, it is evident that member 19 can be rotated about a horizontal axis; and since as hereinafter explained, this member serves as one link in the support of camera 12, this movement serves to impart the panorama movement of the camera. If it be desired to hold the member 19 rigid, it can be clamped to base 14 by the aid of a clamping ring or band 29. This band is supported between flanges 30 and 31 provided respectively on base 14 and member 19; and this band contacts with cylindrical surfaces of equal diameters on base 14 and member 19, as clearly shown in Figs. 1 and 2. The band can be constricted by the operation of a bolt 32 working freely in one ear 33 fastened to one extremity of band 29, and tapping into the other ear 34, fastened to the other extremity.

I shall now describe that portion of the apparatus which provides a tilting adjustment of the camera 12 about a horizontal axis. As shown clearly in Fig. 2, member 19 has a pair of bosses 35, which are tapped at the axis of surface 20 for a pair of bearing screws 36. These screws provide a horizontal stationary pivot for the tilting member 37, on the cylindrical shoulders 38 of these screws. The member 37 has a pair of depending ears 39 which straddle the member 19, and which are bored for the accommodation of the bearing screws.

The tilting member 37 has an extensive flat upper surface 40, in which there are arcuate grooves 41 (Figs. 1 and 3). Overlying these grooves and fastened to the surface 40 is the thin supporting plate 42, upon which camera 12 rests. This plate has a central aperture to permit the passage of screw 43; this screw has a large knurled head 44 formed as a flange which is accommodated in the grooves 41. The diameter of this flange is about the same as the width of the plate 42; it can be readily operated by the thumb and fingers of the user to turn screw 43 tightly into the bottom of camera 12. Thereby this camera is held tightly against the upper surface of plate 42.

The tilting of member 37, as well as rotation of both this member and member 19 is effected by the aid of a long handle 45 which screws into one side of member 37. This handle can be provided with a hand knob 46. It is evident that the member 37, and consequently camera 12, can be tilted by moving handle 45 in a vertical arc, causing member 37 to rotate on screws 36. By moving the handle 45 in a horizontal arc, the members 19 and 37 are both moved about the vertical pivot 17, and camera 12 is rotated to take panorama shots. As a matter of fact, both types of movement can be either simultaneously or successively accomplished to provide any combined movement of the camera that is desired. There is considerable range for the tilting motion, for it is evident that the projecting parts of member 37 are free to travel downwardly in a vertical direction over a large angle before they interfere with the lower portion of member 19. And of course, so far as movement about the vertical axis is concerned, this can be made a complete revolution if desired.

It is sometimes desirable to clamp member 37 in its adjusted position. I accomplish this result by using surface 20 of member 19 as a braking surface. Coacting with this surface is a clamping member or shoe 47 of arcuate form, shown in this instance as pivoted in a recess 48 in member 37. For this purpose a pin 49 is used which is riveted over the sides of member 37. The handle rod 45 is made to perform the function of pressing clamp 47 tight against surface 20, as by providing a rounded tip 50 which engages shoe 47 when rod 45 is screwed inwardly. This shoe 47 can be made from fibre to provide a good braking effect; or it can be faced with a fibre strip 47'. One end of this strip can be held firmly in a slot in member 47, the other end being held against removal by a portion of the member 37.

It is evident that the handle rod 45 serves several important functions in a simple manner. A small twist is sufficient to loosen or tighten clamp 47 to permit the camera to be adjusted in any desired position. The handle rod 45 is used both for tilting the camera about a horizontal axis or for rotating it about a vertical axis.

In Figs. 4 and 5, I disclose a slightly modified form of tilting and rotating head, but in which similar advantages are present. In this instance, there are again a base member 51 that provides a short, vertical pivot post 52, as well as a hinge forming member 53 rotatable about said pivot. A fibre friction washer 54 can be interposed between these two members, as in the first form, and a clamping band 55 can also be used to hold members 51 and 53 rigidly together. In order to urge these resiliently toward each other for providing a small frictional resistance against relative turning, I use in this instance a flat spring 54'. This spring is located in a recess 55' in the upper face of member 53, and has a hole fitting over the pivot 52. This pivot has a square extension 56 over which a square steel washer 58 is accommodated. A screw 57 serves to hold this washer and spring in place so that the spring exerts a clamping pressure between the members 51 and 53.

In this form, the tilting member 59 is accommodated on supporting member 53 in a manner differing slightly from that disclosed in connection with Figs. 1, 2, and 3. Member 53 has a pair of upstanding ears 60, between which is rigidly held a cylindrical pivot forming element 61, made from metal or fibre. This piece is held in place by a series of dowels 62, as well as by the screws 63, all of which pass through the ears 60 and into the member 61.

The tilting member 59 is rotatable upon this member as by the aid of the bored depending lug 70. It supports camera 12 upon plate 64, fastened to the top of member 59 and also to guide member 65. A knurled thumb screw 66 as before, has its head flange accommodated in arcuate grooves 67 formed in parts 59 and 65, and can be manipulated to fasten camera 12 to plate 64.

In order to clamp member 59 against movement on stationary pivot 61, it is provided with a slot 68 severing the top part of member 59 into a rigid left hand portion to which plate 64 is fastened, and a resilient movable portion 69 that can be moved toward the left for gripping the pivot cylinder 61 frictionally by the internal bored surface of lug 70. The handle rod 71 can be used for this purpose, as by having it tap into the rigid portion of member 59. It carries a collar 72 which engages a shoulder in aperture 73 in the portion 69 to urge said portion toward the left for the clamping function.

As in the first form, the handle 71 is used for the dual purpose of moving the head both about a vertical as well as a horizontal axis, and of clamping the head against movement on the horizontal axis.

I claim:

1. In a supporting head, a base having a vertically extending pivot post, said base having an upper surface of considerable extent and a peripheral cylindrical surface, a support disposed over said upper surface and rotatable relatively thereto, said support having a peripheral cylindrical surface alining with that of the base, and a clamping ring engaging both said surfaces.

2. In a supporting head, a base member, said member having an upright pivot, a rotatable member mounted on said pivot, said member having a cylindrical portion with an axis at right angles to that of the pivot, and also having an aperture into which the pivot extends, said pivot having a projection, a coiled spring disposed about the projection and in the cylindrical member, said spring acting to force the base member and the rotatable member together, and a hinged support hinged to the rotatable member and having a friction surface contacting with the cylindrical surface.

3. In a supporting head, a base having a pivot extending upwardly therefrom, as well as a surface of considerable extent around the bottom of the pivot, a member rotatably mounted on said pivot, frictional means for resisting rotation of said member, said member having a lug providing a surface of revolution, a support having a pair of lugs straddling said lug and pivoted thereon, said support also having a flat upper surface with a recess, a friction shoe pivoted in the recess and engaging the surface, and a handle threaded in said support, the inner end of said handle engaging said shoe to press it against said lug.

4. A mounting fitting of the character described, adapted to be interposed between coupling parts detachably securing an apparatus on a support, said fitting comprising a plurality of pivoting mechanisms forming a universal swinging joint including an expansible and compressible member, coupling members terminating said mechanisms, said members being complementary to and adapted to connect with the detachable coupling parts, an extension carried by one of said mechanisms, a handle terminating said extension whereby the swinging movement of the joint is controlled, said extension having releasably engaging means with said joint for locking one of said mechanisms against movement.

5. In a device of the character described, a universal joint comprising a plurality of pivoting mechanisms, said joint terminating at each end by a coupling mounting, an elongated extension carried by one of said mechanisms for controlling the universal movement of said joint from a spaced distance thereof, and a plurality of releasable locking means each independently and selectively operative to restrict the swinging movements of the joint, said extension including one of said locking means.

6. In a supporting head, a member having a pair of surfaces of revolution, the axes of said surfaces being non-parallel, and having a fixed angular relation, and a pair of attaching means respectively confined for relative movement with respect to said member about said axes, each of said means presenting a surface for contact with a respective surface of revolution of said member for preventing such relative movement.

KARL W. THALHAMMER.